(12) United States Patent
Tsutsumi et al.

(10) Patent No.: US 12,145,642 B2
(45) Date of Patent: Nov. 19, 2024

(54) RUNNING PATTERN CREATION DEVICE AND DRIVING CONTROL METHOD THAT USES RUNNING PATTERN CREATION DEVICE

(71) Applicant: HITACHI, LTD., Tokyo (JP)

(72) Inventors: Yuhi Tsutsumi, Tokyo (JP); Keiji Maekawa, Tokyo (JP); Atsushi Oda, Tokyo (JP); Keiichi Katsuta, Tokyo (JP); Masaki Tsuji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 293 days.

(21) Appl. No.: 17/796,572

(22) PCT Filed: Aug. 31, 2020

(86) PCT No.: PCT/JP2020/032934
§ 371 (c)(1),
(2) Date: Jul. 29, 2022

(87) PCT Pub. No.: WO2021/171657
PCT Pub. Date: Sep. 2, 2021

(65) Prior Publication Data
US 2023/0052777 A1    Feb. 16, 2023

(30) Foreign Application Priority Data

Feb. 27, 2020 (JP) .................................. 2020-032405

(51) Int. Cl.
*B61L 27/04* (2006.01)
*B61C 3/02* (2006.01)
(52) U.S. Cl.
CPC ................ *B61L 27/04* (2013.01); *B61C 3/02* (2013.01); *B61L 2201/00* (2013.01)

(58) Field of Classification Search
CPC ........ B61L 27/04; B61L 2201/00; B61C 3/02; B60L 15/2009; B60L 3/0046; B60L 2200/26; B60L 7/00
(Continued)

(56) References Cited

FOREIGN PATENT DOCUMENTS

| JP | 2013-010477 A | 1/2013 |
| JP | 2014-090556 A | 5/2014 |
| JP | 2014-193098 A | 10/2014 |

OTHER PUBLICATIONS

International Search Report with English translation of PCT/JP2020/032934 dated Nov. 24, 2020.

*Primary Examiner* — Hai H Huynh
(74) *Attorney, Agent, or Firm* — Foley & Lardner LLP (57) ABSTRACT

A running pattern creation device includes: a coordinate system that is formed of a positional coordinate axis and a vehicle velocity axis; a stopping avoidance zone position holding unit 1 configured to hold positional information on a stopping avoidance zone of a vehicle 8; a vehicle condition holding unit 2 configured to hold at least information on respective accelerations at an acceleration time, a deceleration time and a coasting time with respect to specification of the vehicle 8; a braking pattern creation unit 3 configured to create a braking pattern that is a pattern for stopping the vehicle 8 at a position other than the stopping avoidance zone using the positional information and information on acceleration at the deceleration time; a coasting pattern creation unit 4 configured to create a coasting pattern that is a pattern for stopping the vehicle 8 at a position other than the stopping avoidance zone using the positional information and the information on acceleration at the coasting time; an object region decision unit 5 configured to decide an object region 5 that is a region surrounded by the positional coordinate, the braking pattern and the coasting pattern; and a scheduled running pattern creation unit 6 configured to (Continued)

create a scheduled running pattern that is a running pattern avoiding the object region 5 and can be expressed by the coordinate system.

7 Claims, 9 Drawing Sheets

(58) Field of Classification Search
USPC .................................................... 701/19, 20
See application file for complete search history.

| STOPPING AVOIDANCE ZONE | START POINT POSITION[m] | END POINT POSITION[m] |
|---|---|---|
| STOPPING AVOIDANCE ZONE1 | 100 | 200 |
| STOPPING AVOIDANCE ZONE1 | 500 | 700 |
| STOPPING AVOIDANCE ZONE1 | 1500 | 1800 |
| STOPPING AVOIDANCE ZONE1 | ... | ... |
| STOPPING AVOIDANCE ZONE2 | 3200 | 3300 |
| STOPPING AVOIDANCE ZONE2 | 3800 | 3950 |
| STOPPING AVOIDANCE ZONE2 | 4600 | 4700 |
| STOPPING AVOIDANCE ZONE2 | ... | ... |
| ... | ... | ... |

| TIME [SEC] | POSITION [m] | VELOCITY [km/h] | DRIVING MANIPULATION |
|---|---|---|---|
| 0 | 0 | 0 | POWER RUNNING |
| 0.1 | 0.01 | 0.3 | POWER RUNNING |
| 0.2 | 0.03 | 0.6 | POWER RUNNING |
| ... | ... | ... | ... |
| 16.6 | 115.5 | 49.5 | POWER RUNNING |
| ... | ... | ... | ... |
| 26.6 | 296.0 | 79.8 | POWER RUNNING |
| 26.7 | 298.2 | 80 | CONSTANT VELOCITY |
| 26.8 | 300.4 | 80 | CONSTANT VELOCITY |
| ... | ... | ... | ... |
| ... | ... | ... | ... |
| ... | ... | ... | ... |
| 99.9 | 1999.4 | 0.3 | BRAKING |
| 100.0 | 2000 | 0 | BRAKING |

RUNNING PATTERN CREATION DEVICE AND DRIVING CONTROL METHOD THAT USES RUNNING PATTERN CREATION DEVICE

TECHNICAL FIELD

The present invention relates to a running pattern creation device and a driving control method that uses the running pattern creation device.

BACKGROUND ART

There is a case where, when an electric train runs between stations, an abnormal state such as a power supply stop caused by a power outage or an overhead wire failure occurs so that the electric train cannot perform power running. In such a case, the electric train stops on the way between the stations. When a point at which the electric train stops is in a stopping avoidance zone, it is necessary to speedily evacuate the electric train from the stopping avoidance zone. Here, "stopping avoidance zone" is a zone that is defined as a zone in which stopping of the electric train is to be avoided (for example, the zone in which stopping of the electric train is prohibited). Specifically, the stopping avoidance zone is a bridge, a tunnel or the like, for example As a means to evacuate the electric train, there has been known a method where a battery is mounted on a vehicle. When the electric train is stopped in the stopping avoidance zone, electric power is supplied to the vehicle from the battery so that the electric train performs power running from the stop point. Accordingly, it is possible to evacuate the electric train from the stopping avoidance zone. However, because of restrictions imposed on a space on the vehicle or a cost, there may be case where mounting of the battery on the vehicle is difficult.

Patent literature 1 discloses a technique where, to stop a vehicle at the safest position when an abnormal state occurs, risks at respective points in a zone where the vehicle can stop from the current position are calculated, and the stop point at which the risk is lowest is determined, and timing of applying braking for stopping the vehicle at such a stop point is notified to a driver.

CITATION LIST

Patent Literature

[patent literature 1] Japanese Unexamined Patent Application Publication No. 2014-193098

SUMMARY OF INVENTION

Technical Problem

The technique disclosed in patent literature 1 has a drawback. That is, in a case where points at which stopping of the vehicle has a high risk exist in a scattered manner in a zone where a vehicle can be stopped, when braking is applied at any timing, the vehicle stops at the point where the risk is high and hence, stopping of the vehicle in stopping avoidance zone cannot be avoided. Accordingly, when an abnormal state occurs, it is necessary to perform a driving control of the vehicle such that stopping of the vehicle in the stopping avoidance zone can be avoided. The present invention has been made in view of the above-mentioned drawback, and it is an object of the present invention to provide a running pattern creation device capable of avoiding stopping of a vehicle in a stopping avoidance zone.

Solution to Problem

To overcome the technical problem described above, there is provided a running pattern creation device that creates a running pattern capable of being expressed as a coordinate system that is formed of a first axis corresponding to a position of a vehicle or a time, and a second axis that is orthogonal to the first axis and corresponds to velocity of the vehicle. The running pattern creation device includes: a stopping avoidance zone position holding unit configured to hold positional information on a stopping avoidance zone that is defined as a zone where stopping of the vehicle is to be avoided; a vehicle condition holding unit configured to hold at least information on respective accelerations at an acceleration time, at a deceleration time and at a coasting time with respect to specification of the vehicle; a braking pattern creation unit configured to create a braking pattern that is a pattern for stopping the vehicle at a position other than the stopping avoidance zone and can be expressed by a coordinate system, using the positional information and the information on acceleration at the coasting time; a coasting pattern creation unit configured to create a coasting pattern that is a pattern for stopping the vehicle at a position other than the stopping avoidance zone and can be expressed by the coordinate system, using the positional information and the information on acceleration at the coasting time; an object region decision unit configured to decide an object region that is a region surrounded by the first axis of the coordinate system, the braking pattern and the coasting pattern; and a scheduled running pattern creation unit configured to create a scheduled running pattern that is a running pattern avoiding the object region and can be expressed by the coordinate system.

Advantageous Effects of Invention

According to the present invention, it is possible to provide a running pattern creation device that can avoid stopping of a vehicle in a stopping avoidance zone.

DESCRIPTION OF EMBODIMENTS

An embodiment 1 of the present invention is described with reference to FIG. 1 to FIG. 8, and an embodiment 2 of the present invention is described with reference to FIG. 5 and FIG. 9. Objects to which the present invention is applicable are, besides an electric railway, a railway that uses dedicated power other than electricity, and a hybrid railway vehicle such as an electric-diesel-engine vehicle. The present invention is also applicable to a hybrid vehicle (hereinafter alleviated as HV), an electric vehicle (hereinafter alleviated as EV) and an internal combustion engine vehicle. Hereinafter, the description is made by exemplifying a passenger electric train that is running under automatic driving. Other vehicles are described when necessary.

Embodiment 1

Figure 1:
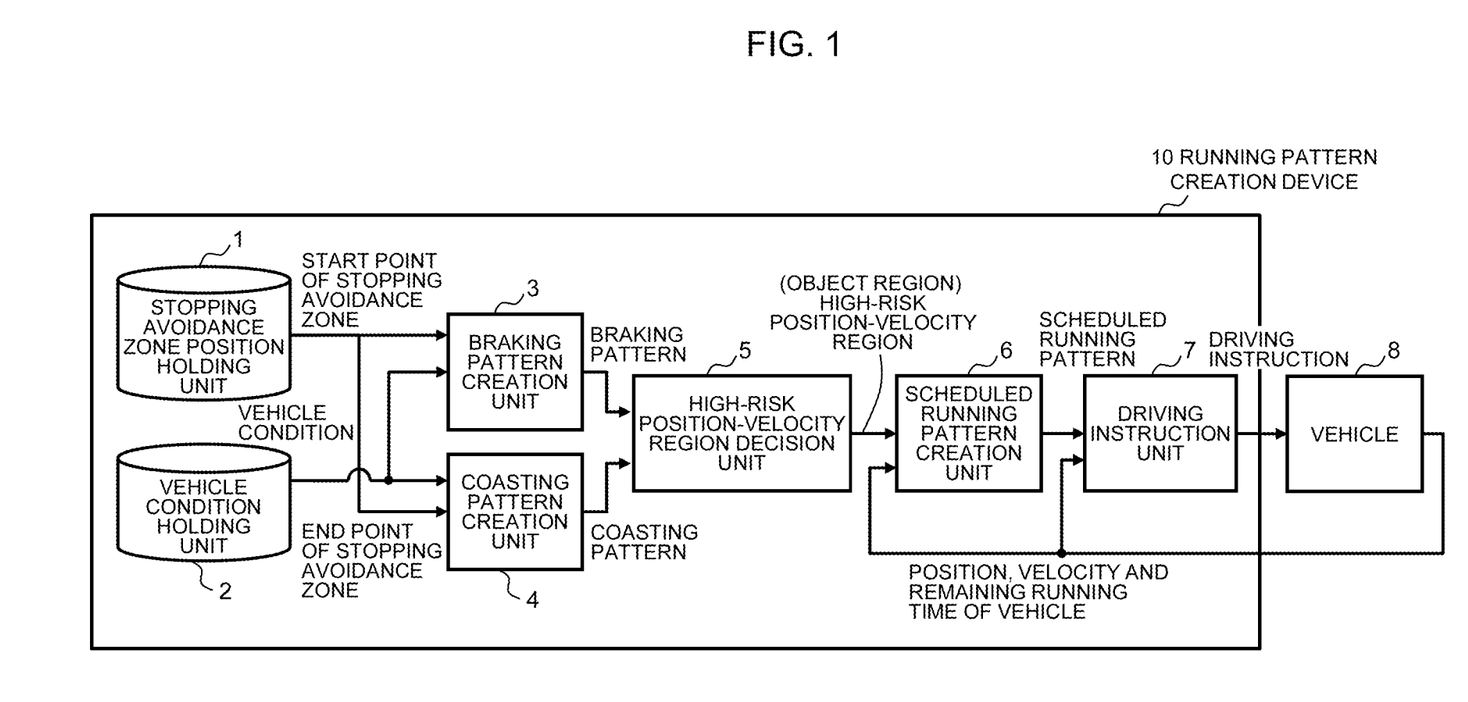
FIG. 1 is block diagram illustrating an overall configuration of a running pattern creation device according to an embodiment 1 of the present invention.

FIG. 1 is a block diagram illustrating an overall configuration of a running pattern creation device according to an embodiment 1 of the present invention. The running pattern creation device 10 illustrated in FIG. 1 collects information relating to a position, velocity and a remaining running time of a vehicle 8, creates an appropriate running pattern based on information on these factors, and gives a driving instruction to the vehicle 8. It is assumed that a driver can drive in accordance with the driving instruction from the running pattern creation device 10 even at a manual driving time in which a driver rides on the vehicle 8.

In this case, a state is estimated where a man assist device not illustrated in the drawing is disposed on a driving panel of the vehicle 8, and is effectively performing its function. Accordingly, unless the vehicle 8 does not receive any disturbance or the like from the outside, the vehicle 8 that has received a driving instruction runs in accordance with the running pattern in both of automatic driving and manual driving. The description will be made hereinafter by exemplifying only a case where the vehicle 8 is a passenger electric train during automatic driving under the above-mentioned condition. However, the running pattern creation device 10 according to the embodiment 1 of the present invention is also applicable to other kinds of vehicles.

The running pattern creation device 10 includes a stopping avoidance zone position holding unit 1, a vehicle condition holding unit 2, a braking pattern creation unit 3, a coasting pattern creation unit 4, a high-risk position-velocity region decision unit (hereinafter also referred to as "object region decision unit") 5, a scheduled running pattern creation unit 6, and a driving instruction unit 7.

The stopping avoidance zone position holding unit 1 has a function of holding positional information on stopping avoidance zones. As described with reference to FIG. 2, the positional information on stopping avoidance zones adopts a format where the position of a start point $\alpha$ and the position of an end point $\beta$ of each stopping avoidance zone are stored as positional data. The vehicle condition holding unit 2 has a function of holding a vehicle condition such as an acceleration/deceleration characteristic of the vehicle 8, a running resistance equation, a total length of the train or the like.

Figure 3:
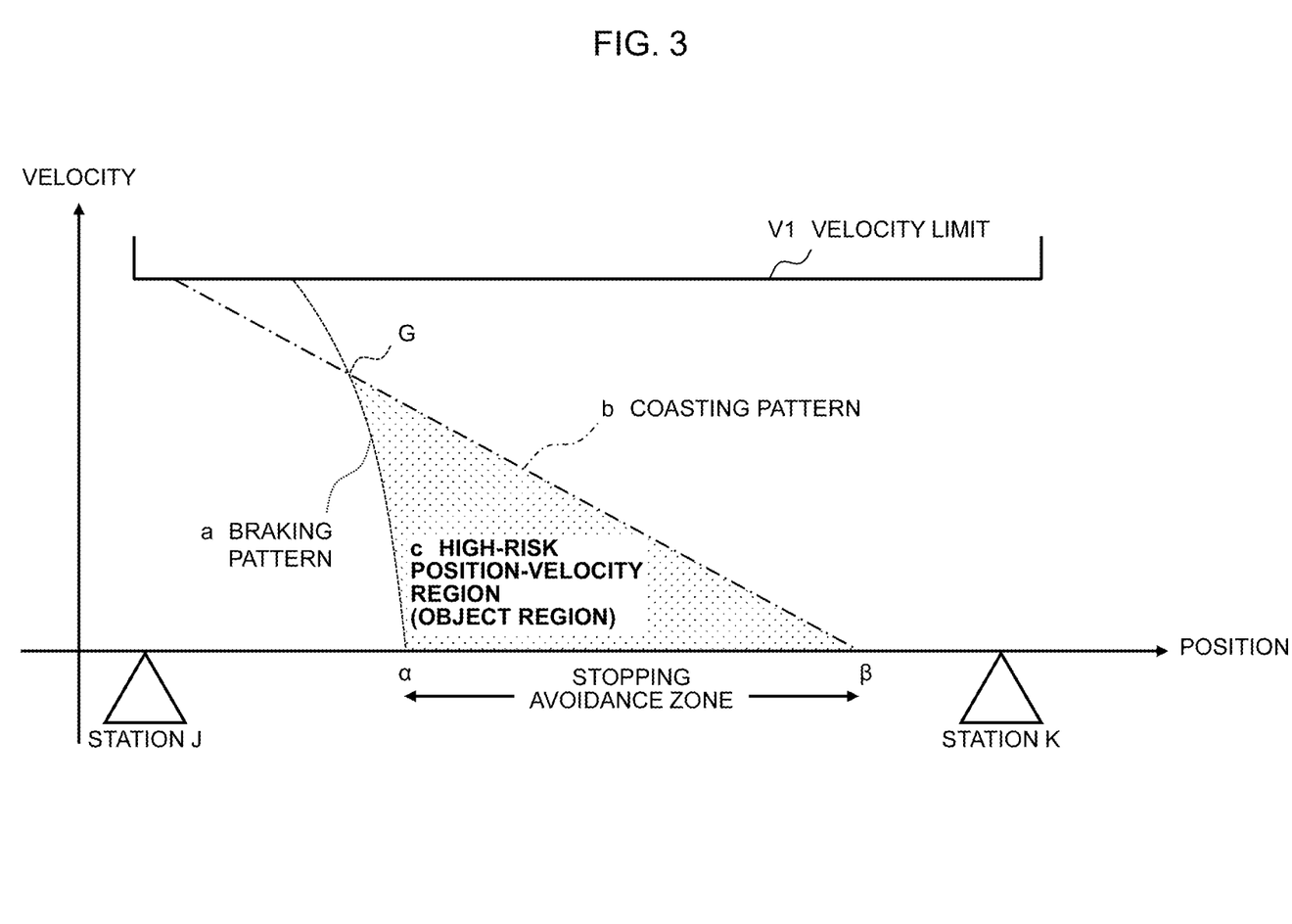
FIG. 3 is a graph illustrating one example of a running pattern that a braking pattern creation unit and a coasting pattern creation unit create in the running pattern creation device illustrated in FIG. 1.

The braking pattern creation unit 3, as will be described later with reference to FIG. 3, has a function of creating a braking pattern a where the start point $\alpha$ of the stopping avoidance zone outputted from the stopping avoidance zone position holding unit 1 is used as a base point, in accordance with the vehicle condition outputted from the vehicle condition holding unit 2. FIG. 3 shows one example of the braking pattern a.

The coasting pattern creation unit 4 has a function of creating a coasting pattern b where the end point $\beta$ of the stopping avoidance zone outputted from the stopping avoidance zone position holding unit 1 is used as a base point, in accordance with the vehicle condition outputted from the vehicle condition holding unit 2. FIG. 3 shows one example of the coasting pattern b.

The high-risk position-velocity region decision unit 5 has a function of deciding a position-velocity region c surrounded by a triangle formed of the braking pattern a outputted from the braking pattern creation unit 3, the coasting pattern b outputted from the coasting pattern creation unit 4 and a straight line that connects the start point $\alpha$ and the end point $\beta$ of the stopping avoidance zone (hereinafter referred to as "high-risk position-velocity region" or "object region") c. One example of the high-risk position-velocity region c is indicated by c in FIG. 3.

The scheduled running pattern creation unit 6 has a function of creating a scheduled running pattern P for running in a position-velocity region that does not overlap with a high-risk position-velocity region c outputted from the high-risk position-velocity region decision unit 5 over a section to an arrival station using a current point and current velocity of the vehicle S as base points.

Further, there may be also a case where normal train velocity limit overlaps with the high-risk position-velocity region c. For example, velocity limit V2 that is described later with reference to FIG. 9 is in a further lower state so that the scheduled running pattern P overlaps with the high-risk position-velocity region c whatever measure is taken.

In such a case, a battery device (an auxiliary battery) that ensures capacity of power consumption amount necessary for making the vehicle run a section that overlaps with the high-risk position-velocity region c may be mounted on the vehicle. Even in a case where such an auxiliary battery is additionally mounted, it is possible to acquire an advantageous effect that a capacity can be considerably made small by applying the running pattern creation device 10 according to the embodiment of the present invention.

The driving instruction unit 7 has a function of issuing a braking instruction in a case where current velocity of the vehicle 8 when an abnormal state occurs is velocity lower than the braking pattern a where the start point $\alpha$ of the stopping avoidance zone is set as the base point, and has a function of instructing coasting driving in a case where the current velocity of the vehicle 8 when the abnormal state occurs is velocity higher than the braking pattern a. The running pattern creation device 10 creates the following driving instructions (1) to (4).

(1) The vehicle 8 is made to run in the position-velocity region where stopping in the stopping avoidance zone is avoided.

(2) In a case where current velocity of the vehicle 8 when an abnormal state occurs is velocity lower than the braking pattern a where the start point α of the stopping avoidance zone is set as the base point, braking is applied to the vehicle 8 so as to stop the vehicle 8 before the start point α of the stopping avoidance zone.

(3) In a case where the current velocity of the vehicle 8 when the abnormal state occurs is velocity higher than the coasting pattern b where the end point β of the stopping avoidance zone is set as the base point, coasting driving is performed so that the vehicle 8 is stopped on a side behind the end point β of the stopping avoidance zone.

(4) When an abnormal state occurs, stopping of the vehicle 8 in the stopping avoidance zone is avoided by the running pattern P that takes into account current velocity of the vehicle 8 and several main conditions.

When an abnormal state occurs in the vehicle 8, the driving instruction (4) can be realized by defining a stopping position as in the case of the driving instruction (2) or the driving instruction (3) in accordance with the direction of the driving instruction (1).

The running pattern creation device 10 may be installed either on the vehicle or on the ground. In a case where the running pattern creation device 10 is installed on the ground, a calculation result is transmitted to an on-vehicle device of the vehicle 8 using a radio signal. As the result, the running pattern creation device 10 can perform a driving control of the vehicle 8 in accordance with a created running pattern.

Figure 2:
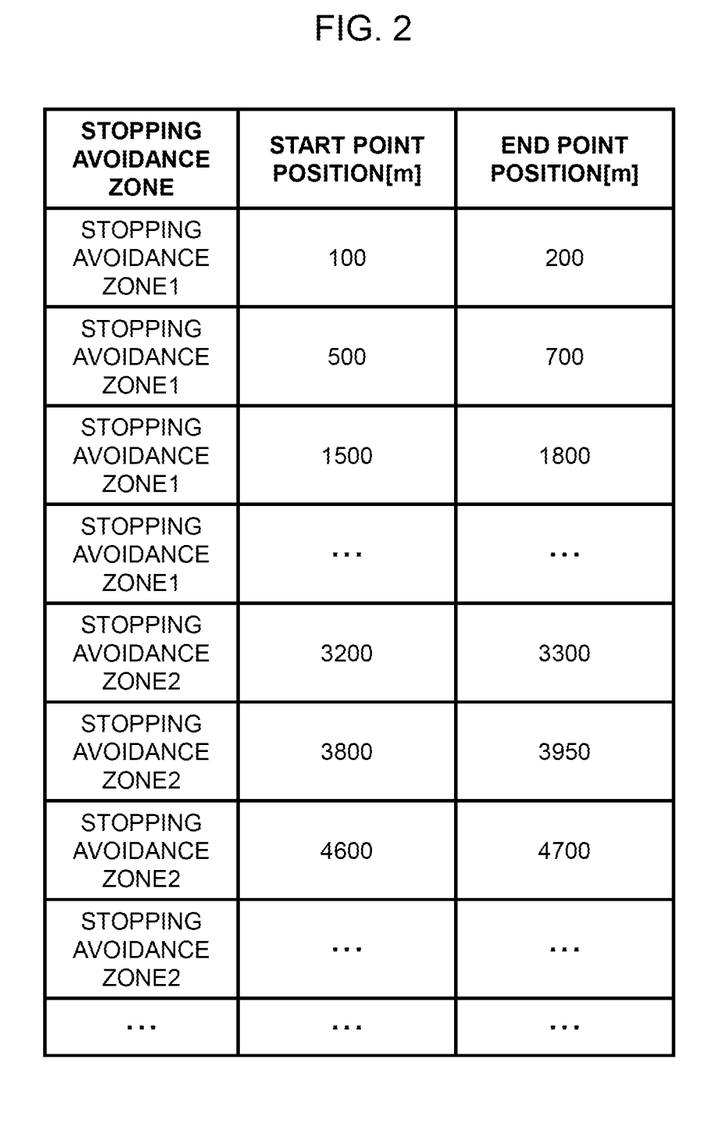
FIG. 2 is a table exemplifying positional information on a stopping avoidance zone that a stopping avoidance zone position holding unit of the running pattern creation device illustrated in FIG. 1 holds.

FIG. 2 is a table exemplifying positional information on a stopping avoidance zone that a stopping avoidance zone position holding unit of the running pattern creation device 10 illustrated in FIG. 1 holds. In the respective rows of the table illustrated in FIG. 2, existing stopping avoidance zones are classified into a first kind stopping avoidance zone and a second kind stopping avoidance zone, and the position of the start point α and the position of the end point β from the predetermined base point are indicated with respect to the respective stopping avoidance zones.

The stopping avoidance zone position holding unit 1 holds the positional information specified in the table illustrated in FIG. 2 such that the positional information is used in an arithmetic operation. The first kind stopping avoidance zone exemplifies an air section where even temporary stopping is strictly prohibited. The second kind stopping avoidance zone exemplifies the deepest portion of a sea bottom tunnel. In the second kind stopping avoidance zone, stopping of the vehicle is avoided irrespective of a length of time by taking into account the difficulty in emergency evacuation. Further, although not exemplified, a stopping avoidance zone N (not illustrated in the drawing) may be set where temporary stopping is allowed for a short time equal to or less than a predetermined value but stopping for a long time equal to or more than a predetermined value is prohibited.

FIG. 3 illustrates one example of a running pattern that the braking pattern creation unit 3 and the coasting pattern creation unit 4 create in the running pattern creation device 10 illustrated in FIG. 1. The running pattern is a line graph created in a coordinate that describes positional information on a route indicating a distance from a base point to a current position of the vehicle 8 on an axis of abscissas and velocity of the vehicle 8 on an axis of coordinates. The running pattern is used in a driving control. The running pattern is created in a range defined by velocity equal to or less than velocity limit 71.

As illustrated in FIG. 3, on a premise that the vehicle 8 is made to perform a desired operation, the running pattern creation device 10 creates a basic running pattern in advance with respect to the vehicle 8. That is, the running pattern creation device 10 can obtain a basic running pattern of the vehicle 8 by performing an arithmetic operation using vehicle information unique to each vehicle 8 and information on a route. The vehicle information includes a weight of the vehicle, a wheel friction and the like besides accelerations indicated with a plus/minus signal at a power running time and a stopping time. Information on the route includes positional information such as gradients and the first kind and the second kind stopping avoidance zones (hereinafter, difference in kind being basically omitted) besides the distances from the base point to the stations J, K.

The running pattern creation device 10 creates a braking pattern a (a in the drawing), a coasting pattern b (b in the drawing) that the coasting pattern creation unit creates, and a power running pattern (d in the drawing) as the basic running patterns of the vehicle 8 on a certain route. The braking pattern a indicates a process where the vehicle 8 is stopped at minus acceleration based on gradients of a route, a weight of a vehicle, a braking performance and other conditions by operating a normal brake different from an emergency brake (simply referred to as "brake") during running of the vehicle 8 at a velocity limit. The power running pattern b is a graph indicating acceleration ability from a point of time that the vehicle 8 is started to a point of time that the velocity of the vehicle 8 reaches the velocity limit.

On the other hand, the coasting pattern b indicates a process where the vehicle is stopped by drawing a gently descending line with minus acceleration based on the gradients of the route, the weight of the vehicle, the wheel friction and the like. Substantially, high reproducibility is expected with respect to the braking pattern a, the coasting pattern b, and the power running pattern d unless the change in environmental conditions including the weight of the vehicle based on the number of passengers is conspicuous. The power running pattern d is limited to the vehicle 8 in which a power running function remains. However, the braking pattern a and the coasting pattern b can be effectively reproduced based on a running resistance equation or the like even when the power running function is lost.

Accordingly, a stopping position of the vehicle 8 can be set as desired by combining these braking pattern a and coasting pattern b. Rather, the vehicle can be stopped avoiding the stopping avoidance zone. As a method of avoiding the stopping avoidance zone, a driving pattern may be created such that the vehicle does not fall in the high-risk position-velocity region c (c in the drawing) that the high-risk position-velocity region decision unit in the running pattern creation device 10 creates, and a driving instruction based on the running pattern may be given to the vehicle 8.

Further, in a case where a plurality of first kind stopping avoidance zones and a plurality of second kind stopping avoidance zones exist between a current point of the vehicle 8 and an arrival station, the running pattern creation device 10 creates the braking pattern a and the coasting pattern b respectively for the first kind stopping avoidance zone and the second kind stopping avoidance zone with respect to the stopping avoidance zones. Alternatively, even when the stopping avoidance zones of the same kind exist between the current point of the vehicle 8 and the arrival station, when necessary, the braking pattern a and the coasting pattern b are respectively created.

The running pattern creation device 10 creates, in accordance with the driving instruction (2), a running pattern such that, in a case where current velocity of the vehicle 8 when an abnormal state occurs is velocity lower than the braking pattern a where the start point α of the stopping avoidance zone is set as the base point, braking is applied to the vehicle 8 so as to stop the vehicle 8 before the stopping avoidance zone. As a result, the vehicle 8 does not fall in the high-risk position-velocity region c.

Further, the running pattern creation device 10 creates, in accordance with the driving instruction (3), a running pattern such that, in a case where the current velocity of the vehicle 8 when the abnormal state occurs is the velocity higher than the coasting pattern b where the end point β of the stopping avoidance zone is used as the base point, coasting driving is performed so that the vehicle 8 is stopped on a side behind the end point β of the stopping avoidance zone. As the result, the vehicle 8 does not fall in the high-risk position-velocity region c.

Figure 4:
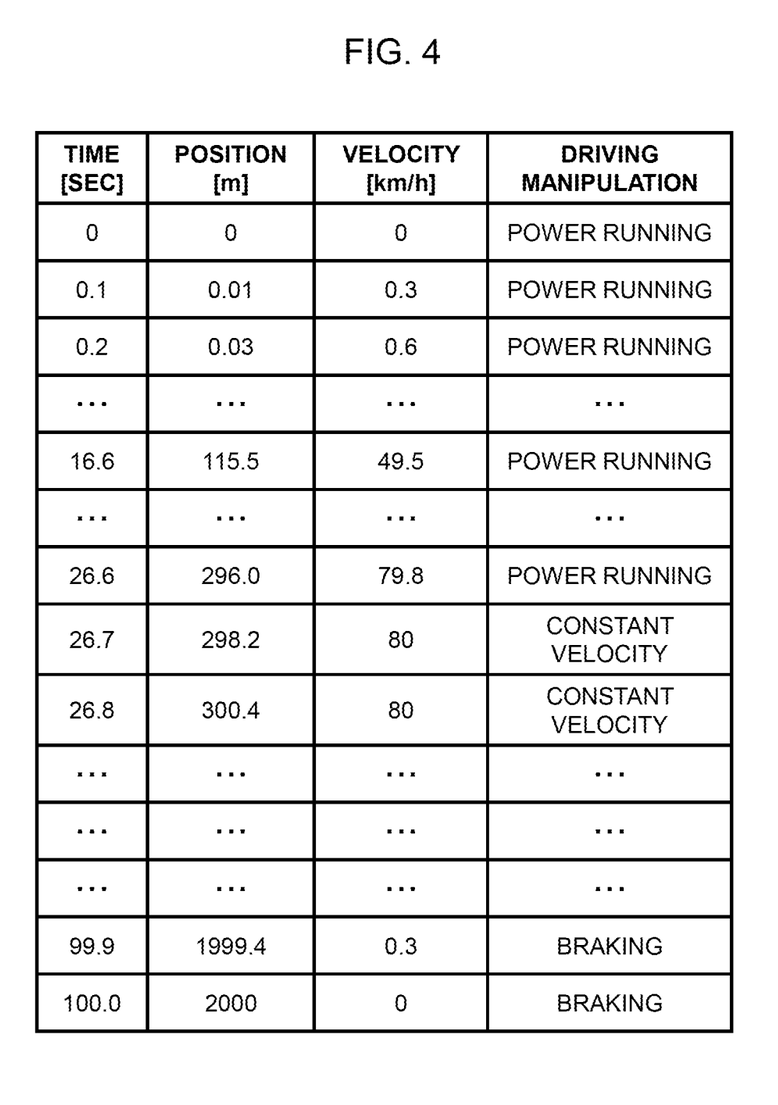
FIG. 4 is a table exemplifying data on a scheduled running pattern that a scheduled running pattern creation unit creates in the running pattern creation device illustrated in FIG. 1.

The running pattern creation device 10 may create the braking pattern a and the coasting pattern b by adding irregularities in designing or a response delay for each vehicle condition outputted from the vehicle condition holding unit 2. Next, a scheduled running pattern P which becomes a base for generating the driving instructions (1) to (4) is described. As illustrated in FIG. 4, the scheduled running pattern P adopts a format where velocities and driving manipulations at respective points are stored in the form of time-series data.

FIG. 4 is a table exemplifying data on a scheduled running pattern P that a scheduled running pattern creation unit 6 creates in the running pattern creation device 10 illustrated in FIG. 1. In the table illustrated in FIG. 4 with respect to the vehicle 8, a first column from the left indicates a running time [sec], the second column from the left indicates a running position [m], the third column from the left indicates the running velocity [km/h], and the fourth column from the left indicates the content of a driving manipulation.

The table illustrated in FIG. 4 is formed as readable data where the states described in the same row are associated with each other. Accordingly, the running pattern creation device 10 detects the current state of the vehicle S based on the time, the running time [sec], the running position [m] and the running velocity [km/h], and outputs a signal for a driving manipulation that becomes optimum corresponding to the detected state.

A method of creating the scheduled running pattern P is described by exemplifying a case where the scheduled running pattern P in which a vehicle runs between stations J, K at a given target running time is created. In this case, a pattern in which the vehicle runs in a section between a designated start point and a next station at a fastest velocity starting from a start velocity at the designated start point (hereinafter referred to as a fastest velocity pattern) is created as an initial value, and the pattern is repeated using hill climbing such that the pattern is adjusted in the range of a tolerance time which is the difference between a running time of the fastest velocity pattern and a given target running time.

In this method, the pattern is adjusted such that the vehicle does not interfere with the high-risk position-velocity region (object region) c illustrated in FIG. 3. As a result, it is possible to create the scheduled running pattern P where the vehicle runs in the position-velocity region that does not overlap with the high-risk position-velocity region c. One example of the scheduled running pattern P is illustrated in FIG. 5.

Figure 5:
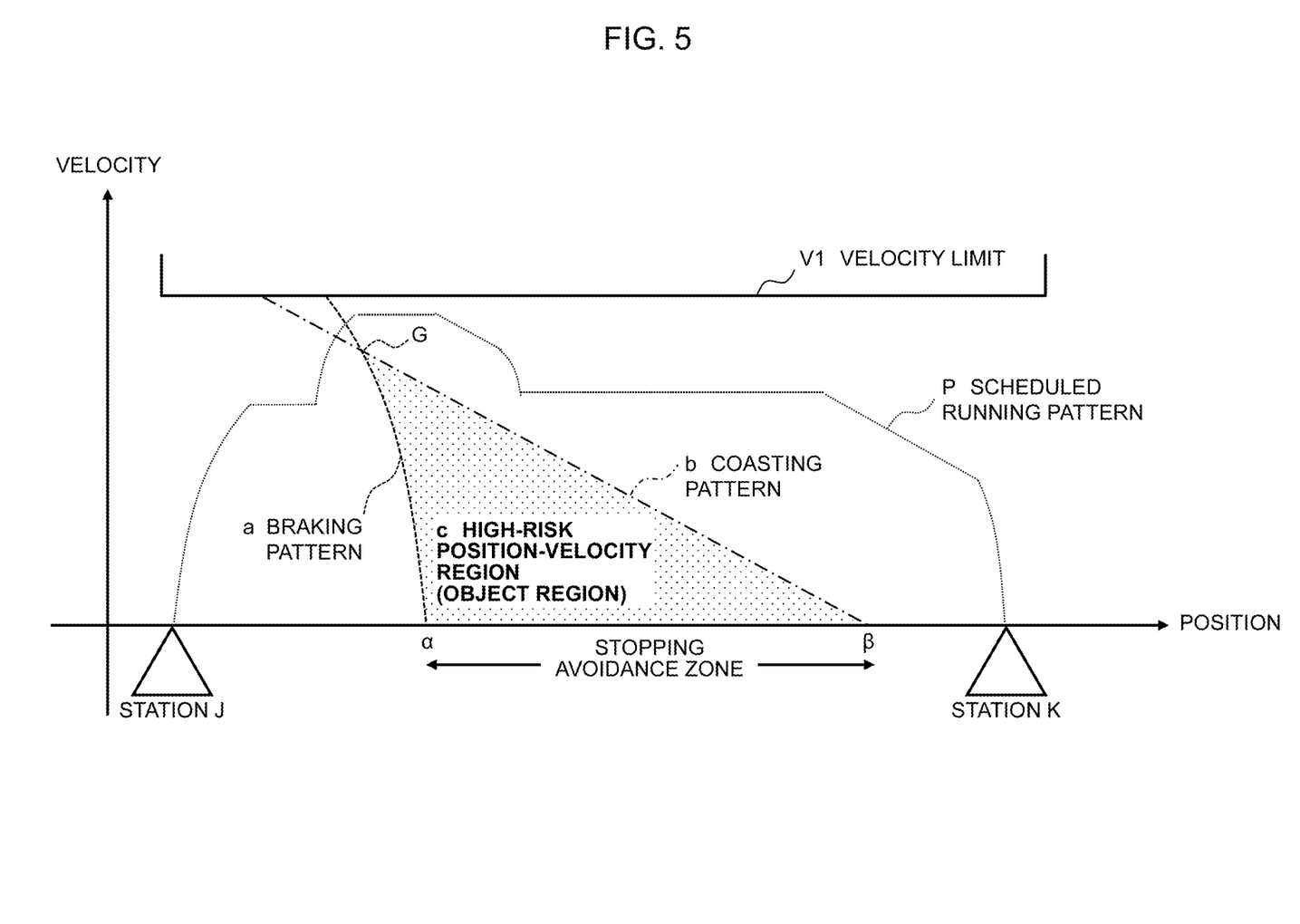
FIG. 5 is a graph exemplifying one example of the scheduled running pattern that the scheduled running pattern creation unit creates in the running pattern creation device illustrated in FIG. 1.

FIG. 5 is a graph exemplifying one example of a scheduled running pattern P that the scheduled running pattern creation unit 6 creates in the running pattern creation device 10 illustrated in FIG. 1. A part between two stations J, K illustrated in FIG. 5 forms a stopping avoidance zone. A situation that makes continuous running of the train 8 difficult exists, the train 8 is stopped before the start point α of the stopping avoidance zone or remote from the end point β of the stopping avoidance zone.

In the scheduled running pattern P created as illustrated in FIG. 5, when an abnormal state occurs in the vehicle 8, a driving instruction (4) is realized by defining the stopping position as in the case of the driving instruction (2) or (3) in accordance with the driving instruction (1) described above. That is, in FIG. 5, the driving control of the vehicle 8 that starts the J station is performed such that the vehicle 8 does not interfere with the high-risk position-velocity region c when the vehicle 8 moves from a left side of an intersecting point G to a right side of the intersecting point G.

Figure 6:
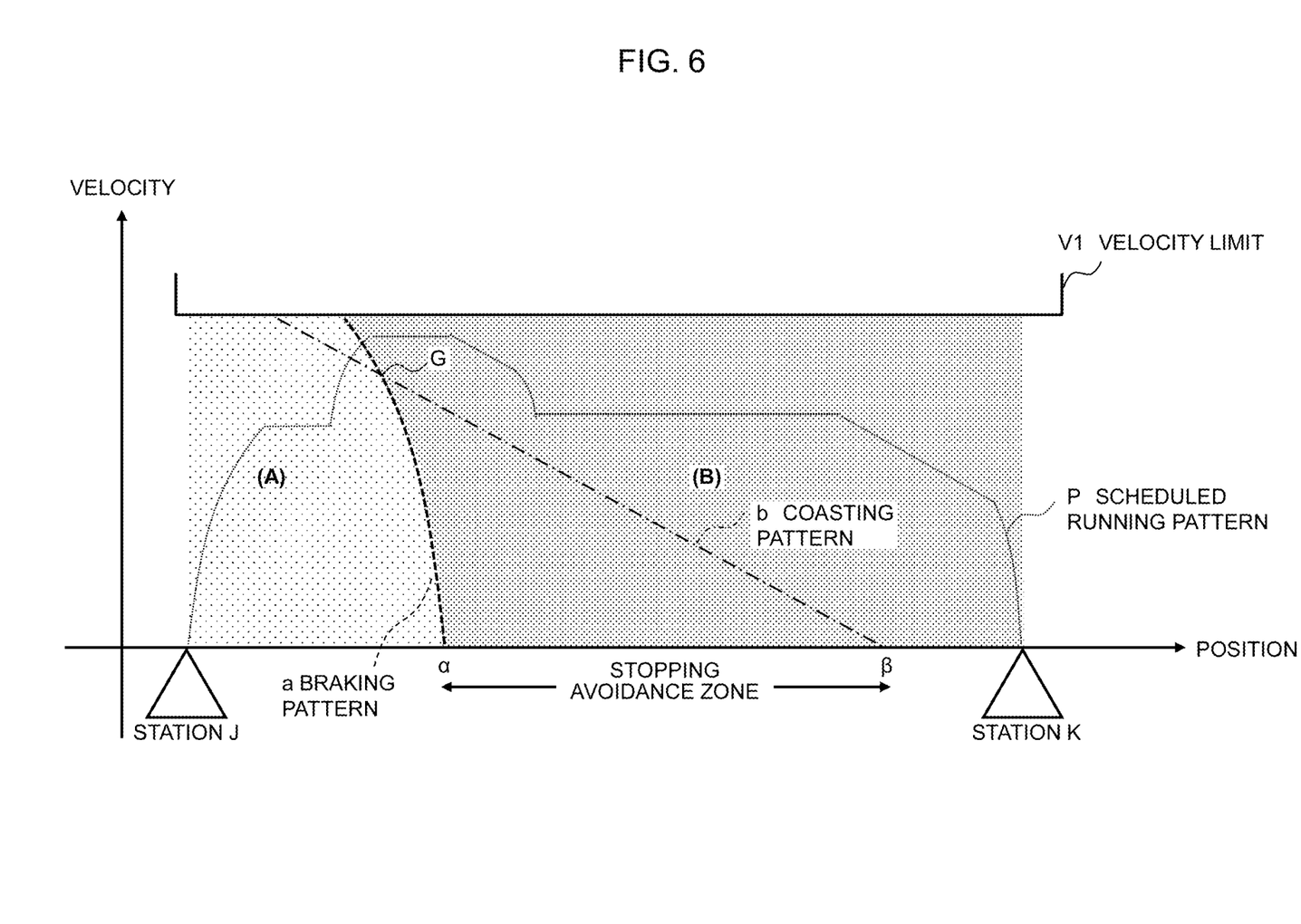
FIG. 6 is an explanatory view illustrating a position-velocity region in a case where a braking instruction is issued, and a position-velocity region in a case where coasting driving is instructed in the running pattern illustrated in FIG. 5.

With such a configuration, a driving control illustrated in FIG. 6 is realized. FIG. 6 is an explanatory view illustrating a position-velocity region (A) in a case where a braking instruction is issued, and a position-velocity region (B) in a case where coasting driving is instructed in the running pattern illustrated in FIG. 5.

(2) In a case where current velocity of the vehicle 8 when an abnormal state occurs is velocity lower than the braking pattern a where the start point α of the stopping avoidance zone is set as the base point, braking is applied to the vehicle 8 so as to stop the vehicle 8 before the start point α of the stopping avoidance zone.

(3) In a case where the current velocity of the vehicle 8 when the abnormal state occurs is velocity higher than the coasting pattern b where the end point β of the stopping avoidance zone is set as the base point, coasting driving is performed so that the vehicle 8 is stopped on a side behind the end point β of the stopping avoidance zone.

The driving control of the vehicle 8 is performed in accordance with an instruction outputted from the driving instruction unit 7. With respect to specific method of controlling the vehicle 8, in case of an unmanned vehicle 8, an automatic control by an ATO (Automatic Train Operation) is sufficient. In case of a manned vehicle 8, it is sufficient for a driver to manipulate in accordance with a driving instruction using a DAS (Driver Advisory System).

In this specification, the driving control method that uses the running pattern creation device 10 according to the embodiment 1 of the present invention is simply referred to as a driving control method or this method. In a case where a stopping avoidance zone exists in a section from a current point of the vehicle to an arrival station, steps of processing for creating a scheduled running pattern P by this method is described with reference to a flowchart illustrated in FIG. 7.

Figure 7:
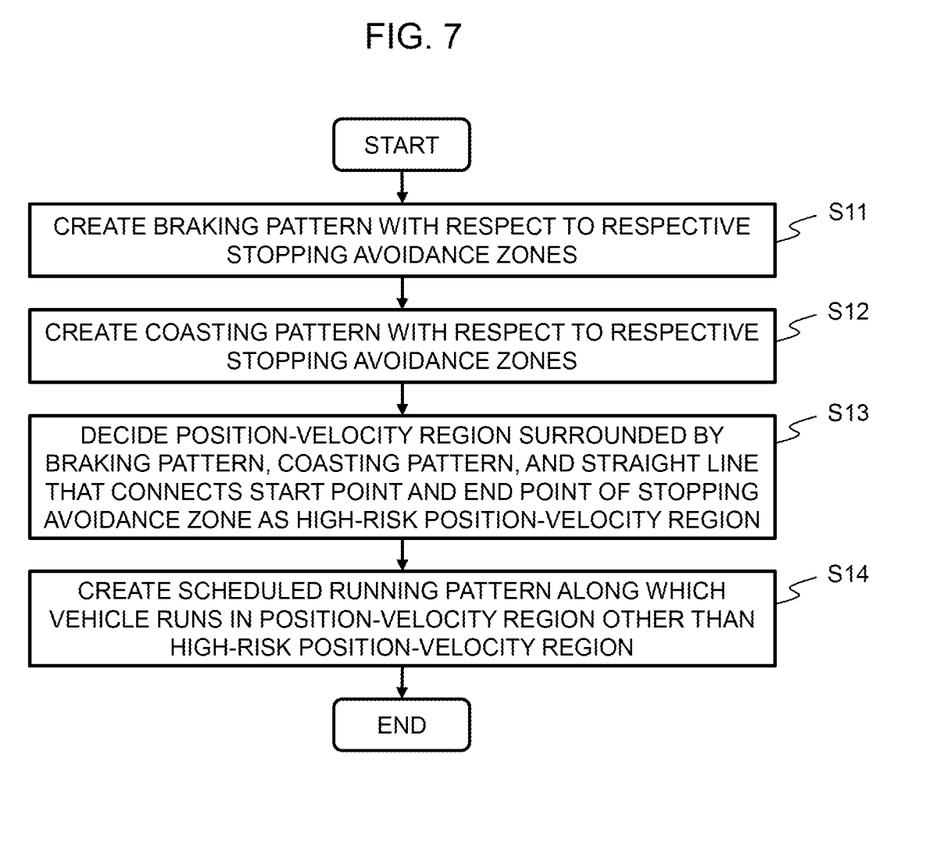
FIG. 7 is a flowchart illustrating processing for creating a scheduled running pattern in the running pattern creation device in FIG. 1.

FIG. 7 is a flowchart illustrating processing for creating a scheduled running pattern P in the running pattern creation device 10 illustrated in FIG. 1. As illustrated in FIG. 7, in step S11, the braking pattern creation unit 3 creates, in accordance with a vehicle condition outputted from the vehicle condition holding unit 2, a braking pattern a where a start point α of each stopping avoidance zone outputted from the stopping avoidance zone position holding unit 1 is set as a base point.

In step S12, the coasting pattern creation unit 4 creates a coasting pattern b where an end point β of each stopping avoidance zone outputted from the stopping avoidance zone position holding unit 1 is set as a base point in accordance with vehicle conditions outputted from the vehicle condition holding unit 2.

In step S13, the high-risk position-velocity region decision unit 5 decides a position-velocity region that is surrounded by the braking pattern a outputted from the braking pattern creation unit 3, a coasting pattern b outputted from the braking pattern creation unit 4 and a straight line that connects a start point α and an end point β of the stopping avoidance zone as the high-risk position-velocity region (object region) c.

In step S14, the scheduled running pattern creation unit 6 creates, over a section to an arrival station by setting a current position and a current velocity of the vehicle 8 as base points, a scheduled running pattern P where the vehicle 8 runs in a position-velocity region that does not overlap with the high-risk position-velocity region c outputted from the high-risk position-velocity region decision unit 5. The steps described above form the flow of processing for creating the scheduled running pattern P in a case where the stopping avoidance zone exists in a section from the current point of the vehicle 8 to the arrival station.

Next, a driving control method using the running pattern creation device 10 according to the embodiment 1 is described. Steps of processing for deciding a driving instruction outputted from the driving instruction unit when the vehicle 8 runs between the stations J, K in accordance with the scheduled running pattern P by applying this method are described using a flowchart illustrated in FIG. 8.

Figure 8:
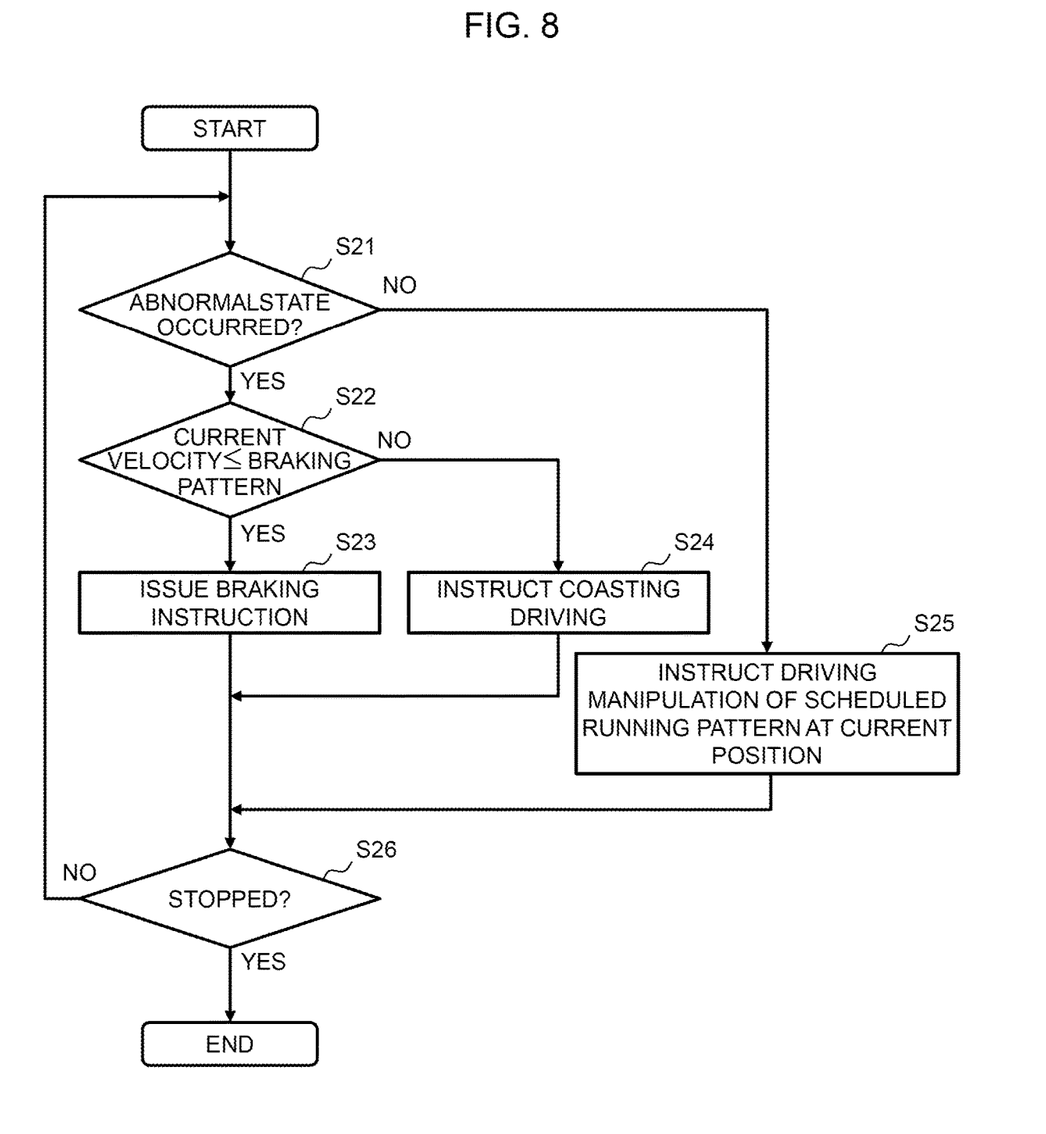
FIG. 8 is a flowchart illustrating processing for deciding a driving instruction outputted from a driving instruction unit in the running pattern creation device illustrated in FIG. 1.

FIG. 8 is a flowchart illustrating processing for deciding a driving instruction outputted from the driving instruction unit in the running pattern creation device 10 in FIG. 1. Hereinafter, a subject that executes processing in a case where the subject is not described is the running pattern creation device 10. In step S21, when an abnormal state is detected during running of the vehicle 8, processing advances to step S22, and when an abnormal state is not detected during running of the vehicle 8, processing advances to step S25.

In step S22, the driving instruction unit 7 advances the processing to step S23 when current velocity of the vehicle 8 is velocity lower than the braking pattern a. On the other hand, the driving instruction unit 7 advances the processing to step S24 when current velocity of the vehicle 8 is velocity higher than the braking pattern a. In step S23, the driving instruction unit 7 issues a braking instruction to the vehicle 8. In step S24, the driving instruction unit 7 issues coasting driving to the vehicle 8.

In step S25, the driving instruction unit 7 issues a driving manipulation of the scheduled running pattern P at a current position to the vehicle 8. In step S26, the driving instruction unit 7 determines whether or not the vehicle 8 is stopped, and when the vehicle 8 is not stopped, the processing returns to step S21, while when the vehicle S is stopped, the processing is finished.

Heretofore, the description is made with respect to a series of processing for deciding a driving instruction that the driving instruction unit 7 outputs when the vehicle 8 runs between the stations J, K in accordance with the scheduled running pattern P. Further, in a case where the vehicle 8 runs between the stations J, K where a stopping avoidance zone having a risk of stopping the vehicle 8 for a long time exists, the running pattern creation device 10 creates the scheduled running pattern P that can avoid the stopping avoidance zone.

For this purpose, the running pattern creation device 10 defines a braking pattern a, a coasting pattern b, and a high-risk position-velocity region c. The braking pattern creation unit 3 creates a braking pattern a such that the vehicle 8 runs backward using the start point α of the stopping avoidance zone as a base point. The coasting pattern creation unit 4 creates a coasting pattern b such that the vehicle 8 runs backward using the end point β of the stopping avoidance zone as a base point.

As the high-risk position-velocity region c (object region), a region surrounded by the straight line that connects the start point α and the end point β of the stopping avoidance zone, the braking pattern a and the coasting pattern b is defined. As illustrated in FIG. 6, the scheduled running pattern creation unit 6 creates the scheduled running pattern P such that the vehicle 8 runs the position-velocity region that does not overlap with the high-risk position-velocity region c.

The running pattern creation device 10 acquires the manner of operation and advantageous effects described hereinafter. With the use of the running pattern creation device 10, it is possible to allow the vehicle 8 to run in the position-velocity region while avoiding stopping of the vehicle 8 in the stopping avoidance zone. Further, in a case where current velocity of the vehicle 8 is velocity lower than the braking pattern a where the start point α of the stopping avoidance zone is used as the base point when an abnormal state occurs, braking is applied to the vehicle 8 so as to make the vehicle 8 stop before the start point α of the stopping avoidance zone.

Further, when the vehicle 8 is running at velocity higher than the braking pattern a, the running pattern creation device 10 makes the vehicle 8 perform coasting driving, and makes the vehicle 8 stop behind the end point β of the stopping avoidance zone. In this manner, the running pattern creation device 10 can avoid stopping of the vehicle 8 in the stopping avoidance zone without mounting an auxiliary battery.

Embodiment 2

By setting a signal system of a railway in the running pattern creation device 10, it is also possible to apply a driving control that takes into account the avoidance of stopping avoidance zone to a vehicle 8 that is running between stations J, K. On the other hand, for example, when the supply of electricity to an overhead wire is stopped (overhead line power outage), there is a concern that such a control becomes an inappropriate control that makes the vehicle 8 stop in the stopping avoidance zone.

As an example, when a signal changes from blue to yellow before the start point α of the stopping avoidance zone, velocity of the vehicle 8 changes from velocity limit V1 that has been an upper limit to a velocity limit V2 that means slow running and hence, the vehicle 8 performs slow driving in accordance with such a change.

Assume a case where the supply of electricity to an overhead wire is stopped during such slow driving in accordance with the signals, there may be a case where it is not possible to prevent the occurrence of a situation that the vehicle 8 is stopped in the high-risk position-velocity region c. The embodiment 2 provides a driving control method that can overcome such a drawback.

Figure 9:
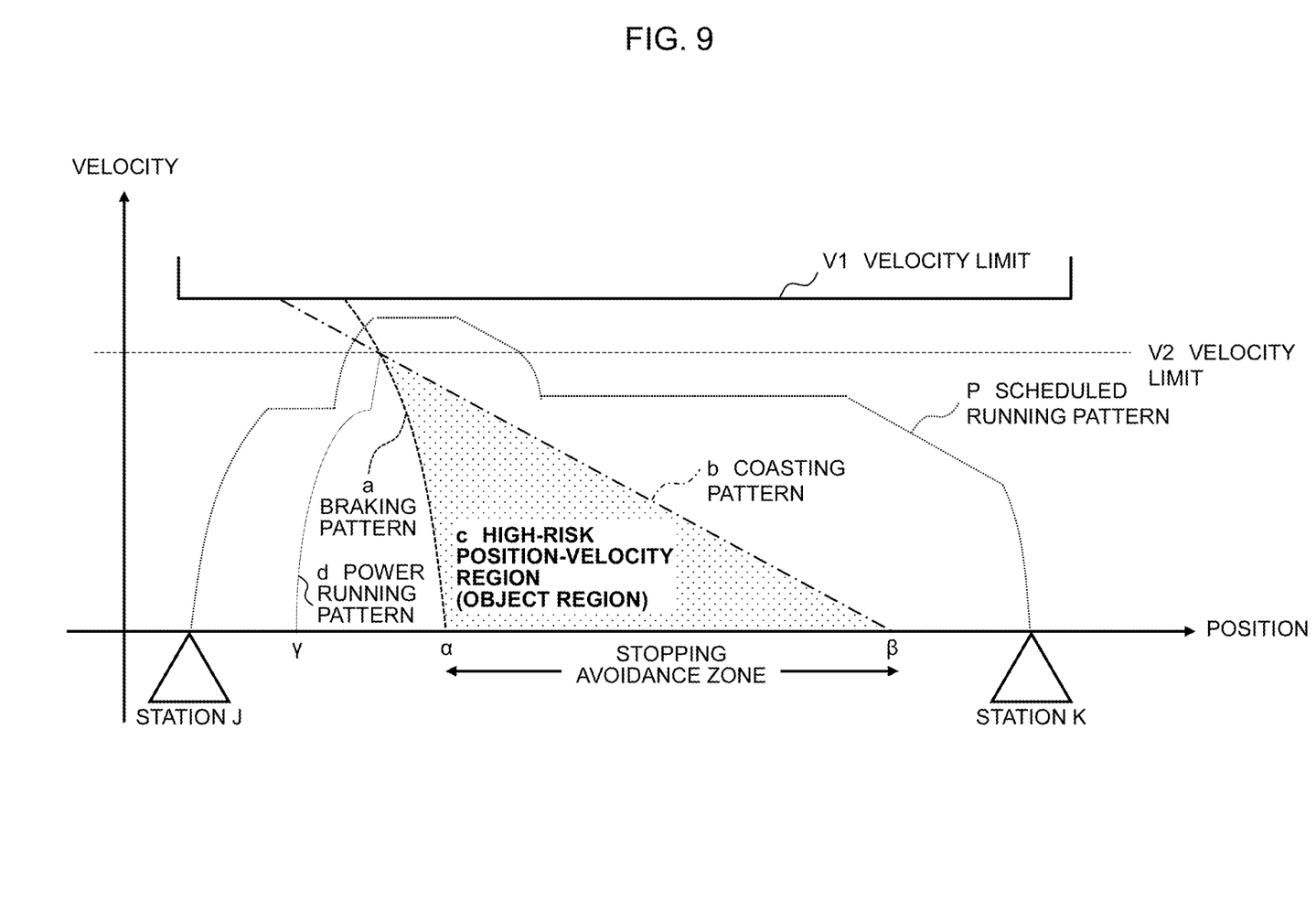
FIG. 9 is an explanatory view for deciding an appropriate stopping position based on the running pattern illustrated in FIG. 5 in a case where velocity limit is temporarily lowered in a driving control method according to an embodiment 2.

FIG. 9 is an explanatory view for deciding an appropriate stopping position based on the running pattern illustrated in FIG. 5 in a case where velocity limit is temporarily lowered in a driving control method according to the embodiment 2.

In this driving control method, the running pattern creation device 10 performs next processing when the running pattern creation device 10 acquires information that the velocity limit is temporarily lowered to the velocity limit 72 equal to or below the intersecting point G.

As illustrated in FIG. 9, the running pattern creation device 10 creates a power running pattern d, and specifies a power running drooping point γ by reversely moving the power running pattern d to a front side from the intersecting point G and by making the power running pattern d droop. Processing for specifying the power running drooping point γ may be performed using the scheduled running pattern creation unit 6.

The running pattern creation device 10 makes the driving instruction unit 7 to transmit an instruction to the vehicle 8 so that the vehicle 8 is stopped and stands by before the power running drooping point γ. When the running pattern creation device 10 receives information that a velocity limit is elevated to the velocity limit 72 that exceeds the intersecting point G during the standby state brought about by such an operation, the running pattern creation device 10 creates a scheduled running pattern P (S14).

In accordance with the scheduled running pattern P, the running pattern creation device 10 makes the driving instruction unit 7 to transmit an instruction to the vehicle 8 so that the state of the vehicle 8 is made to move from a side before the intersecting point G to a side behind the intersecting point G by getting over the intersecting point G. As a result, the vehicle 8 performs coasting to a side behind the end point β of the stopping avoidance zone and stops.

The running pattern creation devices 10 according to the embodiments 1, 2 of the present invention and the driving control methods (the methods of the present invention) that use the running pattern creation devices 10 can be recapitulated as follows.

[1] The running pattern creation device 10 is a computer device that creates a running pattern capable of being expressed as a coordinate system that is formed of a first axis (an axis of abscissas) corresponding to a position of a vehicle 8 or a time of the vehicle 8, and a second axis (an axis of ordinates) that is orthogonal to the first axis (the axis of abscissas and corresponds to velocity of the vehicle 8, and can perform a desired driving control. The running pattern creation device 10 is applicable to a manned vehicle 8 and an unmanned vehicle, or to a manually driven vehicle and an automatically driven vehicle. For example, in a case where the vehicle 8 is a manned manually driven vehicle, a display device or the like that proposes an optimum velocity to a driver from the running pattern creation device 10 may be disposed so as to support the manned manual driving.

As illustrated in FIG. 1, the running pattern creation device 10 includes the stopping avoidance zone position holding unit 1, the vehicle condition holding unit 2, the braking pattern creation unit 3, the coasting pattern creation unit 4, the object region decision unit (the high-risk position-velocity region decision unit) 5, and the scheduled running pattern creation unit 6.

The stopping avoidance zone position holding unit 1 is configured to hold positional information on a stopping avoidance zone that is defined as a zone where stopping of the vehicle 8 is to be avoided. The vehicle condition holding unit 2 is configured to hold at least information on respective accelerations at an acceleration time, a deceleration time and a coasting time with respect to specification of the vehicle 8. The braking pattern creation unit 3 is configured to create a braking pattern that is a pattern for stopping the vehicle 8 at a position other than the stopping avoidance zone and can be expressed by a coordinate system, using the positional information and the information on acceleration at the deceleration time.

The coasting pattern creation unit 4 is configured to create a coasting pattern that is a pattern for stopping the vehicle 8 at a position other than the stopping avoidance zone and can be expressed by the coordinate system, using the positional information and the information on acceleration at the coasting time. The object region decision unit (high-risk position-velocity region decision unit) 5 is configured to decide an object region (a high-risk position-velocity region) that is a region surrounded by the first axis of the coordinate system, the braking pattern and the coasting pattern.

The scheduled running pattern creation unit 6 is configured to create a scheduled running pattern that is a running pattern avoiding the object region and can be expressed by the coordinate system. In the running pattern creation device 10 having such a configuration, the object region decision unit (high-risk position-velocity region decision unit) 5 creates a running pattern such that the vehicle 8 avoids the object region so as not to overlap with the object region. With respect to the vehicle 8 that is subjected to the driving control in accordance with such a running pattern, it is possible to avoid stopping of the vehicle 8 in the stopping avoidance zone.

[2] The running pattern creation device 10 is preferably applicable to a rail transport system. In the rail transport system, the vehicle 8 is formed of at least one compartment and runs on rails. As illustrated in FIG. 3, the stopping avoidance zone is a place that exists between any stations of a railway having two or more stations J, K and has a risk in stopping the vehicle 8 in the place.

In a running pattern that the running pattern creation device 10 creates, the object region (the high-risk position-velocity region) c indicates a position-velocity region surrounded by the braking pattern a that uses the start point α of the stopping avoidance zone as a base point, a coasting pattern b that uses the end point β of the stopping avoidance zone as a base point, and a straight line that connects the start point α and the end point β of the stopping avoidance zone to each other.

As an index of a driving control using the running pattern illustrated in FIG. 3, the intersecting point G between the braking pattern a and the coasting pattern b is defined. The schedule running pattern creation unit 6 creates, in a case where a state of the vehicle 8 is set such that the vehicle 8 moves from a (left) side before the intersecting point G to a (right) side behind the intersecting point G, a scheduled running pattern P such that the vehicle 8 gets over the intersecting point G. With such processing, it is possible to avoid stopping of the vehicle 8 in the stopping avoidance zone.

[3]

The running pattern creation device 10 performs next processing using the schedule running pattern creation unit 6 and other functional units when it is determined that the vehicle 8 has lost power running ability due to a power outage, an engine trouble or the like. The running pattern creation device 10 compares a vehicle state defined by a position and velocity of the vehicle 8 with the braking pattern a.

The schedule running pattern creation unit 6 decides that a braking operation is to be performed when a vehicle state is on a side before the braking pattern a. The running pattern creation device 10 decides that coasting driving is to be performed when a vehicle state is on a side behind the braking pattern a and higher than the coasting pattern b.

The driving instruction unit 7 issues an instruction to the vehicle 8 in accordance with the decision. The vehicle 8 that responds to the driving instruction is subjected to a driving control such that the vehicle 8 is stopped at an appropriate position even when power running ability is lost. As a result, the vehicle 8 avoids the stopping avoidance zone and can be stopped at a safety zone.

[4]

The driving control method (the present method) according to the embodiments 1, 2 of the present invention are methods where a running pattern is created and is performed in response to the position of the vehicle 8 by using the running pattern creation device 10. As described above, the running pattern creation device 10 creates a running pattern that can be expressed by a coordinate system, and a desired driving control can be performed. The driving control method (the present method) that uses such processing creates an appropriate running pattern corresponding to the position of the vehicle 8, and makes the vehicle 8 directly or indirectly perform the running pattern.

With respect to the specification of the vehicle 8, the running pattern creation device 10 holds, in advance, at least information on acceleration at the time of acceleration, at the time of deceleration and at the time of coasting, and positional information on a stopping avoidance zone that exists on a running path. Further, the running pattern creation device 10 performs the following processing illustrated in FIG. 7 in preparation for an emergency case even in a usual time.

The braking pattern creation unit 3 creates a braking pattern of the vehicle 8 using information on acceleration at the time of deceleration so as to make the vehicle 8 stop avoiding the stopping avoidance zone. (S11). The coasting pattern creation unit 4 creates a coasting pattern of the vehicle 8 using information on acceleration at the time of coasting so as to make the vehicle 8 stop avoiding the stopping avoidance zone (S12).

The object region decision unit 5 decides an object region c to be avoided by combining the braking pattern a and the coasting pattern b (S13). The scheduled running pattern creation unit 6 creates a scheduled running pattern P in which the vehicle 8 runs in a position-velocity region that does not overlap with the object region c (S14). The vehicle 8 is subjected to a driving control based on the scheduled running pattern P created in this manner and hence, the vehicle 8 runs in the position-velocity region that does not overlap with the object region c. Accordingly, it is possible to avoid stopping of the vehicle 8 in the stopping avoidance zone.

[5]

As the method (the present method) of performing an appropriate driving control of the vehicle 8 formed of one or more vehicles that runs on a railway, it is preferable to perform the following steps by using the running pattern creation device 10. The running pattern creation device 10 defines, in the running pattern illustrated in FIG. 3 and FIG. 5, the object region (high-risk position-velocity region) c that is surrounded by the braking pattern a where the start point α of the stopping avoidance zone is used as a base point, the coasting pattern b where the end point β of the stopping avoidance zone is used as a base point, and the straight line that connects the start point α and the end point β of the stopping avoidance zone.

The running pattern creation device 10, as illustrated in FIG. 3 and FIG. 5, defines the intersecting point G between the braking pattern a and the coasting pattern b in the running pattern (S13). As illustrated in FIG. 5, when the state of the vehicle 8 moves from the side before the intersecting point G to the side behind the intersecting point G, the running pattern creation device 10 creates a scheduled running pattern P such that the state of the vehicle 8 gets over the intersecting point G (S14).

According to this driving control method, it is possible to create the scheduled running pattern P such that the vehicle 8 is not stopped in the stopping avoidance zone that exists between any stations of a railway having two or more stations J, K so that a risk that the vehicle 8 stops in the stopping avoidance zone is avoided.

[6]

In this running control method, the running pattern creation device 10 performs the next processing when the running pattern creation device 10 determines that the vehicle 8 has lost power running ability. The running pattern creation device 10 compares the vehicle state that is defined by the position and the velocity of the vehicle 8 with the braking pattern a.

The running pattern creation device 10 decides that braking is operated if the state of the vehicle is on a side before the braking pattern a, and issues an instruction to the vehicle 8 in accordance with the decision. As a result, the vehicle 8 stops before the start point α of the stopping avoidance zone.

The running pattern creation device 10 decides the coasting driving if the state of the vehicle is on a side behind the braking pattern a and the state of the vehicle is higher than the coasting pattern b, and issues an instruction to the vehicle 8 in accordance with the decision. As a result, the vehicle 8 performs coasting to a side behind the end point β of the stopping avoidance zone. Accordingly, it is possible to avoid stopping of the vehicle 8 in the stopping avoidance zone.

[7]

In this driving control method, when the running pattern creation device 10 acquires information that the velocity limit V2 is temporarily lowered below the intersecting point G, the running pattern creation device 10 performs the next processing. As described in FIG. 9, the running pattern creation device 10 creates a power running pattern d, reversely moves the power running pattern d to a side before the intersecting point G, makes the power running pattern d droop, and specifies a power running drooping point γ obtained by such drooping.

The running pattern creation device 10 makes the driving instruction unit 7 issue a driving instruction to the vehicle 8 such that the vehicle 8 stops and stands by before the power running drooping point γ. When the running pattern creation device 10 receives information that the velocity limit V2 exceeds the intersecting point G and is elevated and returned during the corresponding vehicle 8 is in a standby state, the running pattern creation device 10 creates the scheduled running pattern P (S14).

The running pattern creation device 10, in accordance with the scheduled running pattern P, makes the driving instruction unit 7 issue a driving instruction to the vehicle 8 so that the state of the vehicle 8 moves from a side before the intersecting point G to a side behind the intersecting point G by getting over the intersecting point G. As a result, the vehicle performs coasting to a side behind the end point β of the stopping avoidance zone and stops there. Accordingly, even when the velocity limit V2 is temporarily lowered to the intersecting point G or below due to a temporarily changing signal or the like between the stations J, K, the vehicle 8 can stop while avoiding the stopping avoidance zone.

The present invention is not limited to the embodiments described above, and includes various modifications. Further, a part or the entirety of each of the respective configurations, functions, processing units, processing means and the like described above may be realized by hardware by designing an integrated circuit, for example. Further, the respective configurations, functions and the like described above may be realized by software such that processors interpret programs for realizing the respective functions and execute the respective functions.

Information such as programs, tables and files that realize the respective functions may be installed in a storage device such as a memory, a hard disc and a solid state drive (SSD), or recording medium such as an IC card, an SD card or a DVD. The running pattern creation device 10 may be realized by a field programmable gate array (FPGA), a custom LSI, a static random, access memory (SRAM) or a flash memory.

REFERENCE SIGNS LIST

1: stopping avoidance zone position holding unit
2: vehicle condition holding unit
3: braking pattern creation unit
4: coasting pattern creation unit
5: object region decision unit (high risk position-velocity region
decision unit)
6: scheduled running pattern creation unit
7: driving instruction unit
8: vehicle
10: running pattern creation device

The invention claimed is:

1. A running pattern creation device that creates a running pattern capable of being expressed as a coordinate system that is formed of a first axis corresponding to a position of a vehicle or a time, and a second axis that is orthogonal to the first axis and corresponds to velocity of the vehicle, the running pattern creation device comprising:
   a stopping avoidance zone position holding unit configured to hold positional information on a stopping avoidance zone that is defined as a zone where stopping of the vehicle is to be avoided;
   a vehicle condition holding unit configured to hold at least information on respective accelerations at an acceleration time, a deceleration time and a coasting time with respect to specification of the vehicle;
   a braking pattern creation unit configured to create a braking pattern that is a pattern for stopping the vehicle at a position other than the stopping avoidance zone and can be expressed by a coordinate system, using the positional information and the information on acceleration at the deceleration time;
   a coasting pattern creation unit configured to create a coasting pattern that is a pattern for stopping the vehicle at a position other than the stopping avoidance zone and can be expressed by the coordinate system, using the positional information and the information on acceleration at the coasting time;
   an object region decision unit configured to decide an object region that is a region surrounded by the first axis of the coordinate system, the braking pattern and the coasting pattern; and
   a scheduled running pattern creation unit configured to create a scheduled running pattern that is a running pattern avoiding the object region and can be expressed by the coordinate system.

2. The running pattern creation device according to claim 1, wherein
   the vehicle is formed of at least one or more vehicles and is configured to run on a railway,
   the stopping avoidance zone exists between any stations of a railway having two or more stations,
   the object region is defined to a region that is surrounded by a braking pattern where a start point of the stopping avoidance zone is used as a base point, a coasting pattern where an end point of the stopping avoidance zone is used as a base point, and a straight line that connects the start point and the end point of the stopping avoidance zone to each other,
   an intersecting point between the braking pattern and the coasting pattern is defined, and
   the scheduled running pattern creation unit is configured to create a scheduled running pattern along which the vehicle runs while getting over the intersecting point when the state of the vehicle moves from a side before the intersecting point to a side behind the intersecting point.

3. The running pattern creation device according to claim 2, wherein
   in a case where power running ability of the vehicle is lost,
   the scheduled pattern creation unit is configured to compare a vehicle state defined by a position and velocity of the vehicle with the braking pattern,
   the scheduled pattern creation unit is configured to decide that a braking operation is to be performed in a case where the state of the vehicle is on a side before the braking pattern,
   the scheduled pattern creation unit is configured to decide that coasting driving is to be performed in a case where the state of the vehicle is on a side behind the braking pattern and is higher than the coasting pattern, and
   the scheduled pattern creation unit is configured to issue an instruction in accordance with the decision.

4. A driving control method of performing a desired driving control by creating a running pattern capable of being expressed by a coordinate system formed of a first axis corresponding to a position of a vehicle or a time and a second axis being orthogonal to the first axis and corresponding to velocity of the vehicle, the driving control method comprising the steps of:
   holding in advance positional information on a stopping avoidance zone where stopping of a vehicle is to be avoided;
   holding in advance also at least information on acceleration at a time of acceleration, at a time of deceleration and at a time of coasting with respect to a specification of the vehicle;
   creating a braking pattern that is a pattern for stopping the vehicle at a position other than the stopping avoidance zone and capable of being expressed by the coordinate system, using the positional information and information on the acceleration at the time of deceleration;
   creating a coasting pattern that is a pattern for stopping the vehicle at a position other than the stopping avoidance zone, the coasting pattern capable of being expressed by the coordinate system, using the positional information and information on the acceleration at the time of coasting;
   deciding an object region surrounded by the first axis in the coordinate system, the braking pattern and the coasting pattern; and creating the scheduled running pattern being a running pattern that avoids the object region, the scheduled running pattern capable of being expressed by the coordinate system.

5. The driving control method according to claim 4, wherein the vehicle is formed of at least one or more vehicles and is configured to run on a railway, the stopping avoidance zone stopping avoidance zone exists between stations of any railway having two or more stations, stopping the vehicle in the stopping avoidance zone having a risk, the object region is defined to a region that is surrounded by a braking pattern where a start point of the stopping avoidance zone is used as a base point, a coasting pattern where an end point of the stopping avoidance zone is used as a base point, and a straight line that connects the start point and the end point of the stopping avoidance zone to each other, an intersecting point between the braking pattern and the coasting pattern is defined, and when the state of the vehicle moves from a side before the intersecting point to a side behind the intersecting point, a scheduled running pattern is created along which a state of the vehicle runs while getting over the intersecting point.

6. The driving control method according to claim 5, wherein in a case where it is determined that power running ability of the vehicle is lost, a vehicle state defined by a position and velocity of the vehicle is compared with the braking pattern, the vehicle state is decided as a braking operation in a case where the state of the vehicle is on a side before the braking pattern, the vehicle state is decided as a coasting driving in a case where the state of the vehicle is on a side behind the braking pattern and is higher than the coasting pattern, and an instruction is issued in accordance with the decision.

7. The driving control method according to claim 5, wherein a power running pattern is created when a velocity limit is temporarily lowered to the intersecting point or less, the power running pattern is moved reversely from the intersecting point to a side before the intersecting point, is made to droop, and a power running drooping point is specified, the vehicle is made to stand by on a side before the power running drooping point, and when the velocity limit gets over the intersecting point and is elevated and restored, the scheduled running pattern is created where the vehicle is made to run such that the state of the vehicle moves from a side before the intersecting point to a side behind the intersecting point by getting over the intersecting point.

* * * * *